(12) United States Patent
Auriol (10) Patent No.: US 9,291,186 B2
(45) Date of Patent: Mar. 22, 2016

(54) FASTENING MEMBER

(75) Inventor: Pierre Auriol, Flourens (FR)

(73) Assignee: ERIS, Flourens (FR)

( * ) Notice: Subject to any disclaimer, the term of this patent is extended or adjusted under 35 U.S.C. 154(b) by 44 days.

(21) Appl. No.: 14/131,091

(22) PCT Filed: Jul. 5, 2012

(86) PCT No.: PCT/FR2012/051589
§ 371 (c)(1),
(2), (4) Date: Apr. 11, 2014

(87) PCT Pub. No.: WO2013/004977
PCT Pub. Date: Jan. 10, 2013

(65) Prior Publication Data
US 2014/0301806 A1    Oct. 9, 2014

(30) Foreign Application Priority Data

Jul. 7, 2011 (FR) ...................................... 11 56165

(51) Int. Cl.
*F16B 19/00* (2006.01)
*F16B 19/04* (2006.01)
*F16B 19/05* (2006.01)

(52) U.S. Cl.
CPC .................. *F16B 19/04* (2013.01); *F16B 19/05* (2013.01)

(58) Field of Classification Search
CPC ...... F16B 19/04; F16B 19/05; F16B 19/1045; F16B 19/1054; B16J 15/022
USPC .................................................. 411/43, 361
See application file for complete search history.

(56) References Cited

U.S. PATENT DOCUMENTS

| | | | | | |
|---|---|---|---|---|---|
| 3,915,053 | A | * | 10/1975 | Ruhl | 411/361 |
| 5,054,977 | A | * | 10/1991 | Schultz | 417/43 |
| 5,314,281 | A | * | 5/1994 | Turlach et al. | 411/361 |
| 5,562,379 | A | * | 10/1996 | Rausch et al. | 411/361 |
| 6,019,559 | A | | 2/2000 | Myers et al. | |
| 6,494,652 | B1 | * | 12/2002 | Summerlin | 411/43 |

OTHER PUBLICATIONS

International Search Report, Oct. 19, 2012, from International Phase of the instant application.
English Translation of the Written Opinion of the International Search Authority, Jan. 7, 2014, from International Phase of the instant application.

* cited by examiner

*Primary Examiner* — Gary Estremsky
(74) *Attorney, Agent, or Firm* — Paul & Paul (57) ABSTRACT

The invention relates to an attachment member (R) of the "lockbolt" type comprising a pin (100) and a ring (200), said pin (100) comprising a head (110) at one end and having, on its body, a first part (120) grooved with a plurality of locking grooves or channels (121p, 121c, 121d) enabling the ring (200) engaging with the pin (100) to attach itself thereto by deformation, and a second part (130) that is grooved in order to cooperate with a tool (O), characterized in that said grooved part (120) of the pin (100) is preformed so as to provide a series of non-helical grooves (121p, 121c, 121d), the beginning and the end of the series consisting of grooves (121p, 121d) that have different profiles from the identical grooves (121c) located in the central part of said series, the different profile having an identical depth but a greater width compared to the profile of the grooves (121c) located in the central portion of the series. The invention is applicable to the production of attachments and rivets.

14 Claims, 8 Drawing Sheets

FASTENING MEMBER

FIELD OF THE INVENTION

The present invention relates to the field of fastening members of the rivet type and particularly to adaptations for enhancing the mechanical resistance features thereof.

DESCRIPTION OF THE PRIOR ART

The invention particularly relates to a two-part fastening member of the rivet type such as those known under the trade name "lockbolt".

This rivet such as that described in the document FR 2503805 comprises a pin and a ring, said pin comprising a head at one end and having on the body thereof a plurality of locking grooves or slots enabling the ring engaged on the pin to fasten thereto by means of deformation.

Such a design is suitable for fastening parts together by drilling a through hole therein, with said head bearing on one end of the hole and with said ring acting, once deformed and fastened to the pin, as a bearing surface opposite the head at the other end of the hole.

Said pin comprises a first grooved portion for engaging with the ring and a second grooved portion for engaging with the tool for holding the pin during the extrusion of the ring on the first grooved portion. To facilitate the manufacture of such members, the grooves of each portion are conventionally identical.

This second grooved pin portion is separated from the first by a deeper groove or slot suitable for enabling the rupture of the pin, once a tensile force threshold has been exceeded.

The mechanical features of the fastener obtained such as the tear strength are thus primarily dependent on the link between the first grooved pin portion and said ring.

Designers of such fasteners have conducted research to enhance said features.

In this way, for example, extending the length of the pin and the ring is suitable for increasing the mechanical features, it being understood that such an extension results in an equivalent increase in the protrusion formed by the fastener and requires tools with a greater travel.

Suitable choice of materials may help enhance the mechanical features but such a choice may prove to be costly and require specific tools.

As described in the document FR 2283347, fastening members were designed to provide a first grooved pin portion for engaging with the ring preformed with the grooves adopting a pitch tending to increase progressively on moving away from the head. Enlarging the pitch makes it possible, with the same depth, to allow more material of the ring to engage with the pin during the deformation thereof.

Nonetheless, the ring does not exhibit regular deformation along the entire length thereof enabling equal engagement thereof with each groove. Conventionally, the ends of the hollow core of said ring do not fill the corresponding grooves to the same extent as the central portion thereof. This disparity increases for the limit conditions of use of the fastening member, i.e.:
  when the available length of the first grooved portion of the pin for engaging with the ring is maximal and where the thickness of the assembly is minimal (scenario hereinafter referred to as "mini grip"), or
  when the available length of the first grooved portion of the pin for engaging with the ring is minimal and where the thickness of the assembly is maximal (scenario hereinafter referred to as "maxi grip").

It is thus obvious that the number of completely filled grooves differs and may not be deemed to be sufficient. Progressively enlarging the pitch of the grooves does not guarantee that the number of completely filled grooves will be sufficient and likewise does not guarantee an equal number of grooves in a "maxi grip" scenario or in a "mini grip" scenario. This difference is all the more detrimental in a progressive pitch design in that, in the two scenarios described, the same first grooved pin portion area is not involved in receiving the ring.

These variations in the number and type of grooves engaged result in variable mechanical resistance features of the fastener obtained, according to whether the fastener required is far from or close to the limit conditions of use.

DESCRIPTION OF THE INVENTION

On the basis of this situation, the applicant conducted research intended to:
  firstly, enhance the mechanical features obtained using a two-part fastening member,
  and, secondly, render these technical features as regular as possible despite variations in position of the ring according to whether the fastener required is far from or close to the limit conditions of use.

This research led to the design and embodiment of a technological solution not only applicable to two-part fastening members but also more generally to any fastener comprising at least one pin with grooves or slots and at least one ring fastening by means of deformation onto said grooves or slots.

The fastening member according to the invention is of the type comprising a pin and a ring, said pin comprising a head at one end and having on the body thereof a first grooved portion with a plurality of locking grooves or slots enabling the ring engaged on the pin to fasten thereto by means of deformation and a second grooved portion for engaging with a tool for holding the pin during the extrusion of the ring on the first grooved portion, a rupture slot facilitating the detachment of the second portion once a stress threshold has been exceeded during fitting.

According to the invention, this fastening member is characterized in that said grooved portion of the pin is preformed to have a sequence of non-helical grooves, the start and end whereof are formed by grooves having different profiles to the identical grooves situated in the central portion of said sequence, the different profile adopting an identical depth but a greater width to those of the profile of the grooves situated in the central portion of the sequence.

The presence of different profiles in the sequence of grooves is suitable for optimizing the mechanical features of the fastener obtained. The presence thereof at the start and end of the sequence of preformed slots associated with that of mutually identical slots situated in the intermediate portion in the grooved portion is suitable for guaranteeing this optimization whether in a "mini grip" or "maxi grip" configuration.

Furthermore, having a wider groove at the ends makes it possible to have a larger empty space to be filled by the ring. The larger this empty space, the lower the force required to crimp the ring (it is easier to deform the ring since it does not come into direct contact with a rib).

The fact that the sequence of grooves does not adopt a helical structure is in compliance with the basic design of a "lockbolt" type fastening member and prevents any risk of loosening due to unscrewing.

According to a further particularly advantageous feature of the invention, the start and end grooves of the sequence of grooves which have different profiles to those situated in the central portion are mutually identical. In addition to facilitating manufacture, such a feature tends to render the mechanical behavior of the fastener equivalent in both "maxi grip" and "mini grip" scenarios.

Further particularly advantageous features are suitable for being associated with all or some of those already mentioned, as such, for example:
- a single groove adopts a different profile at the start and end of the sequence;
- a plurality of grooves adopt a different profile at the start and end of the sequence;
- said width of the different grooves is substantially equal to 1.5 times that of the identical grooves situated in the central portion of the sequence;
- the different profile is non-symmetrical;
- the pin head is countersunk,
- the top surface of the pin head is convex.

The applicant has devised a plurality of associations of materials, a list whereof is provided hereinafter:
- the pin made of 7000 series aluminum and the ring made of 6000 series aluminum
- the pin made of TA6V titanium and the ring made of 2024 T42 aluminum
- the pin made of titanium with a mechanical resistance (Rm) greater than 1000 MPa (TA6V, Ti6-6-2, etc.) and the ring made of T40 titanium (Rm) greater than 400 MPa or Ti3Al2.5V Titanium (Rm greater than 500 MPa).

As a general rule, the material of the pin would have an Rm value greater than 1.5 times that of the ring.

It should be noted nonetheless that, according to the size and number of the grooves present at the ends, this ratio of 1.5 could be reduced since the wider said grooves are, the lower the crimping force (there is more empty space and it is thus easier to deform the ring and fill the grooves).

The fundamental concepts of the invention having just been described above in the most basic form thereof, further details and features will emerge more clearly on reading the following description with reference to the appended figures, giving merely as a non-limiting example, an embodiment of a fastening member according to the invention.

DESCRIPTION OF PREFERRED EMBODIMENTS

Figure 1:
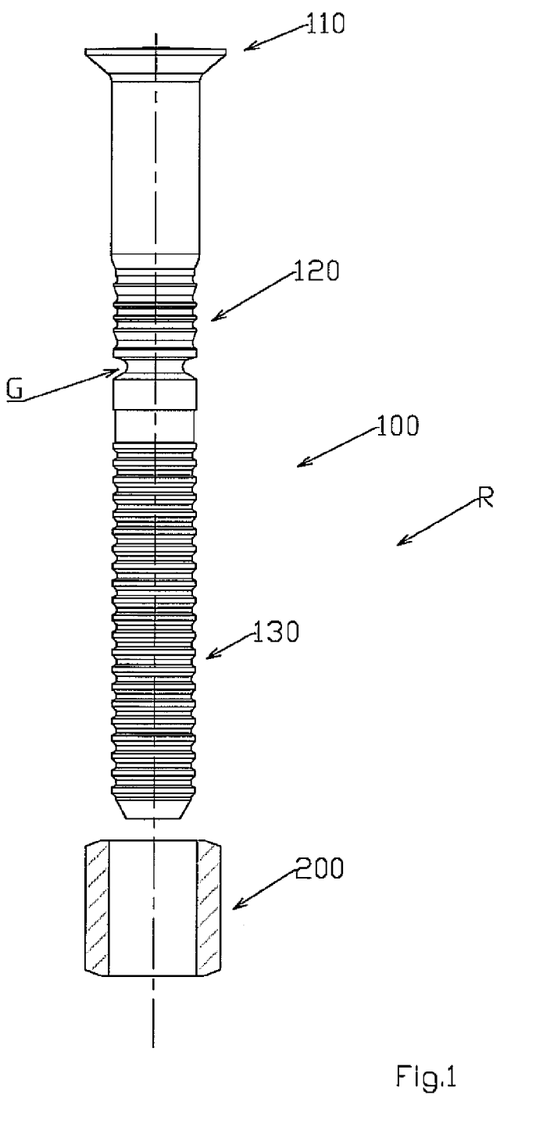
FIG. 1 is a schematic drawing of an embodiment of a fastening member according to the invention.

As illustrated in the drawing in FIG. 1, the fastening member according to the invention, in this case a "lockbolt" type rivet referenced R as a whole, comprises two parts:
a pin 100 and a ring 200.

Said pin 100 comprises at one end a head 110 which is in this case countersunk and has, on the body thereof, a plurality of grooves or slots situated on different parts of said pin.

More specifically, said pin 100 comprises a first grooved portion 120 for engaging with the ring 200 and a second grooved portion 130 for engaging with the tool 0 (see FIGS. 4, 5, 7, 8, 9) for holding the pin 100 during the extrusion of the ring 200 on the first grooved portion 120.

A rupture slot G facilitates the detachment of the second portion once a stress threshold has been exceeded during fitting.

Figure 2:
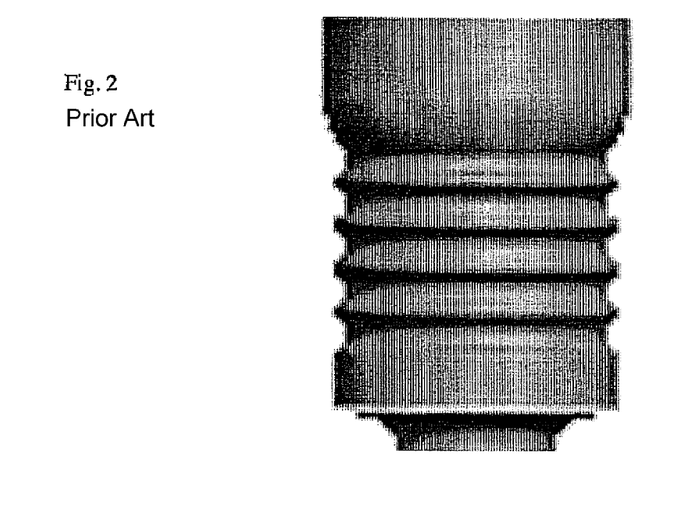
FIG. 2 is a schematic drawing of the first grooved portion of a pin according to the prior art.
Figure 3:
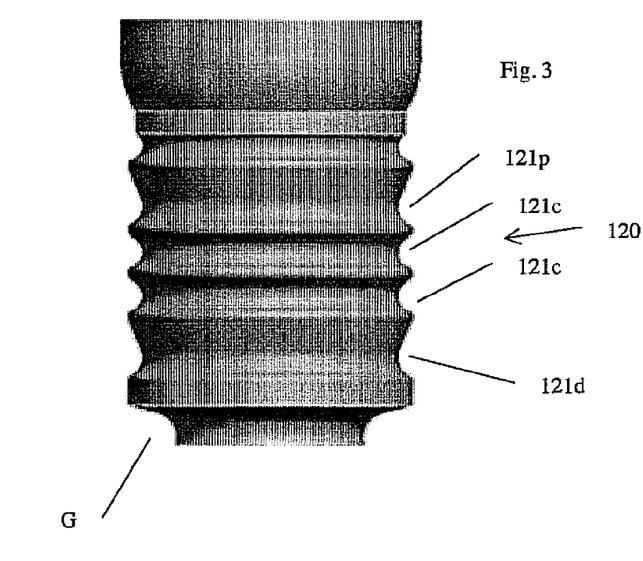
FIG. 3 is a schematic drawing of the first grooved portion of the pin according to the invention.

The invention will emerge more clearly in the comparison between a first grooved portion according to the prior art illustrated by the drawing in FIG. 2 with the first grooved portion 120 of the rivet R according to the invention.

It is obvious that the preformed grooves in said first portion according to the prior art are non-helical and identical with an identical pitch, depth and profile.

On the other hand, said first grooved portion 120 of the pin 100 of the rivet according to the invention adopts a sequence of non-helical grooves 121 where the first groove 121$p$ and the last groove 121$d$ are identical but different to those 121$c$ arranged between the two.

These grooves are parallel and have a plane of symmetry or a median plane perpendicular to the longitudinal axis of the pin.

As illustrated, these start and end grooves 121$p$ and 121$c$ of the first grooved portion 120 intended to receive the ring, adopt a different pitch and a non-symmetrical profile.

This profile has a rib depth and a height equal to those of the profile of the grooves 121$c$ but with a different slope on either side of the bottom of the groove.

In this way, moving away from the head, the slope joining the upper edge of the groove 121$p$ is more progressive than that starting from the bottom of the groove to join the second upper edge. According to one preferred embodiment, the width of the grooves 121$p$ and 121$c$ is equal to 1.5 times that of the grooves 121$c$.

The same applies for the groove 121$d$ whereas said slopes on either side of the bottoms of the grooves 121$c$ are equal.

In order to enhance the behavior of the countersunk head 110 during fitting to prevent the so-called umbrella deformation phenomenon, the head has, prior to fitting, a slightly convex top surface.

According to one preferred but non-limiting embodiment, the grooves are preformed by rolling.

According to a further preferred embodiment, the ring is made of 6000 series aluminum alloy and the pin is made of a 7000 series aluminum alloy.

Figure 4:
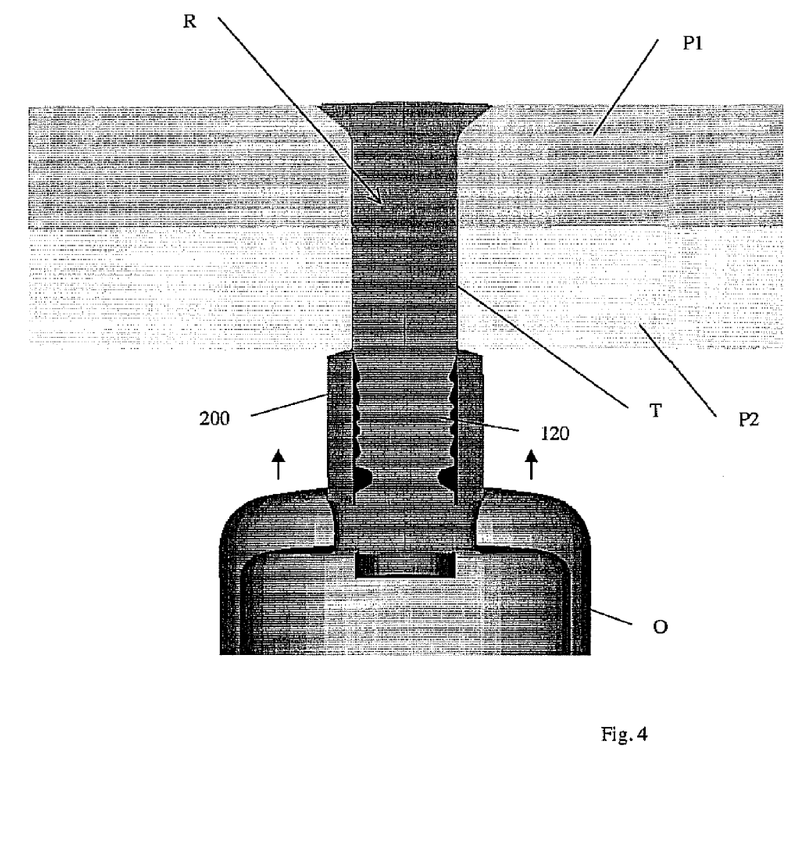
FIG. 4 is a schematic sectional drawing illustrating the operation for fitting a fastening member according to the invention based on a "maxi grip" at the start of fitting.
Figure 5:
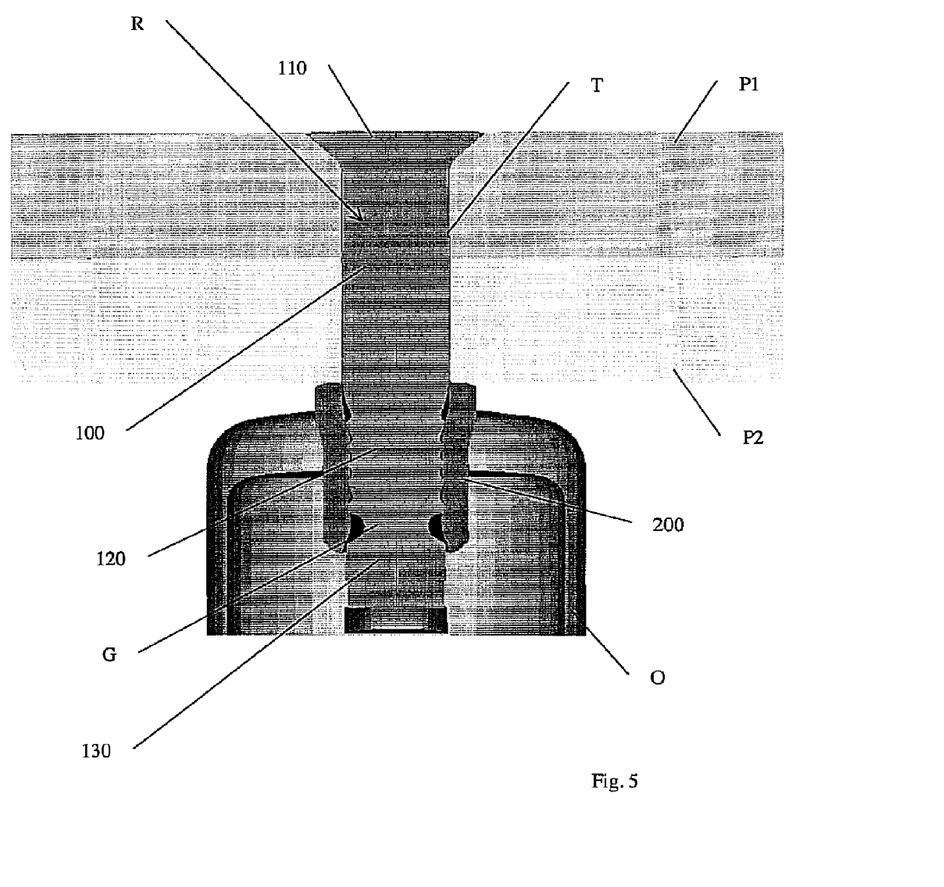
FIG. 5 reproduces the drawing in FIG. 4 during ring deformation.
Figure 6:
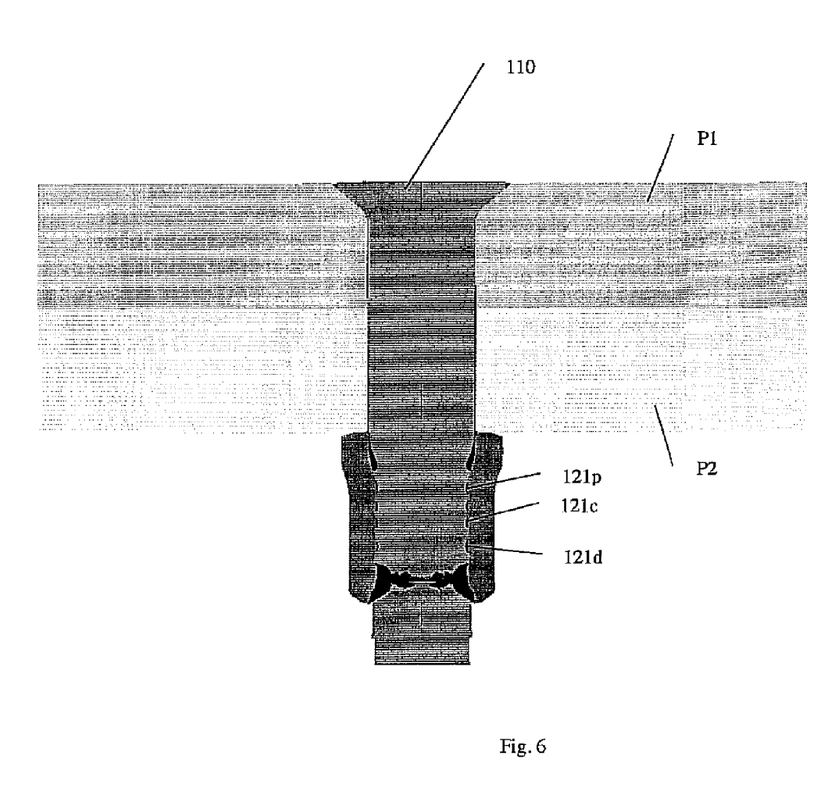
FIG. 6 illustrates the rupture of the pin.

FIGS. 4, 5 and 6 illustrate fitting of the rivet R in a "maxi grip" configuration.

As illustrated, the rivet R is positioned in a countersunk through hole T provided in the two parts P1 and P2 for the purposes of assembly. The pin 100 is positioned to bear the countersunk head 110 thereof on the countersink of the hole T and the ring 200 is engaged on the pin 100. A tool O is associated with the second grooved portion 130 of the pin 100 so as to perform, by pulling on the pin 100, the deformation of the ring 200 on the first grooved portion 120.

It is obvious, in the drawing in FIG. 6, that the inner surface of the ring 200 molds as closely as possible to the grooves 121$d$ and 121$c$ and, to a lesser extent, the groove 121$p$.

Figure 7:
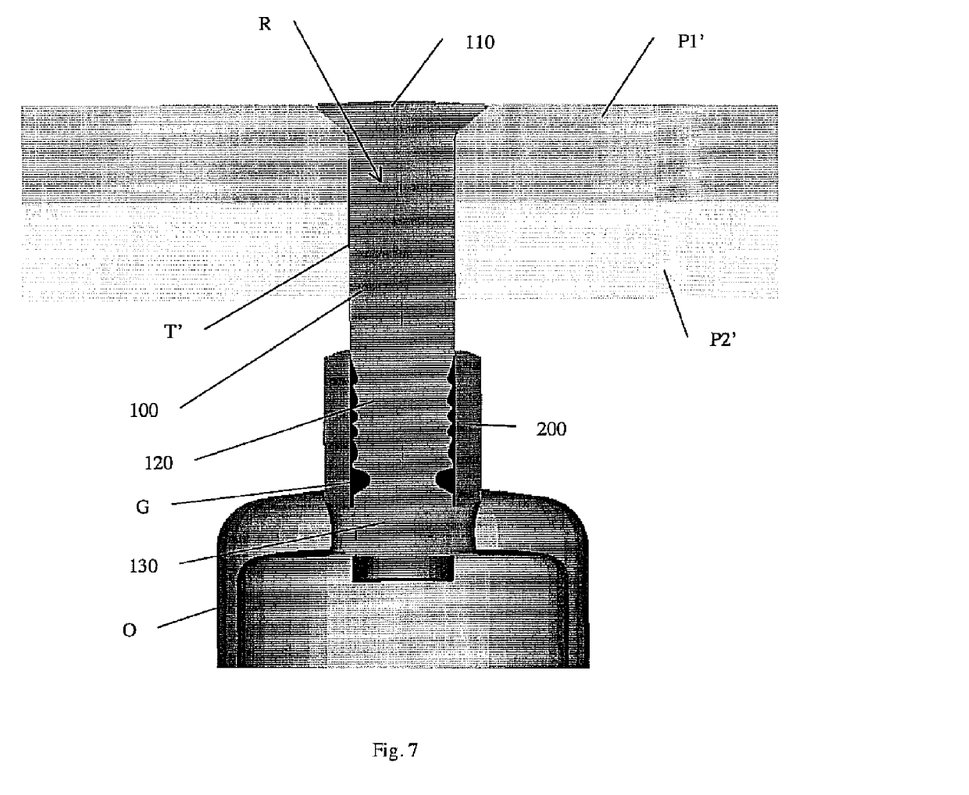
FIG. 7 is a schematic sectional drawing illustrating the operation for fitting a fastening member according to the invention based on a "mini grip" at the start of fitting.
Figure 8:
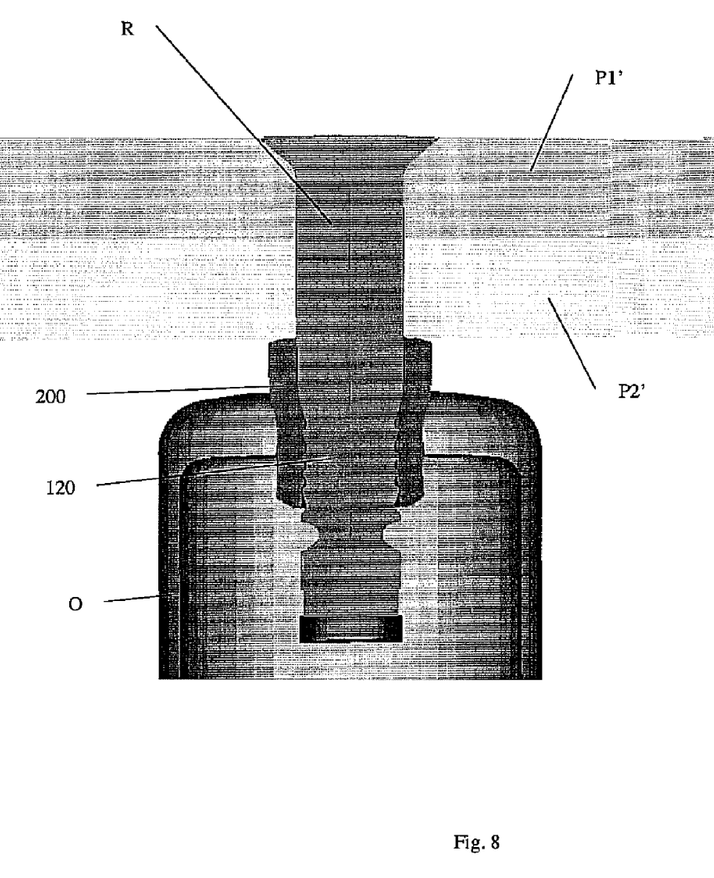
FIG. 8 reproduces the drawing in FIG. 4 during ring deformation.
Figure 9:
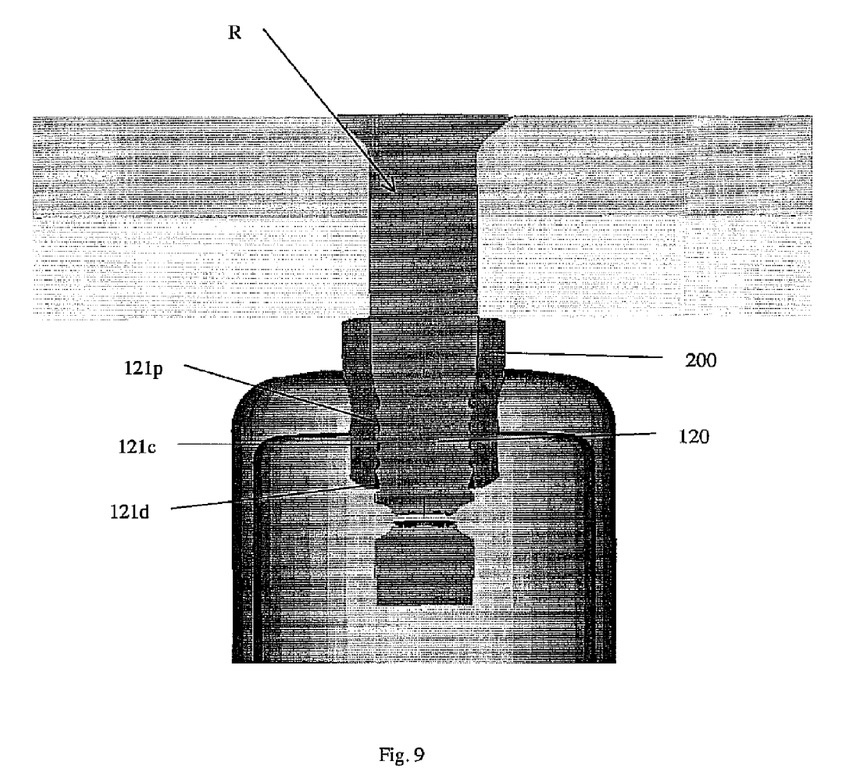
FIG. 9 illustrates the rupture of the pin.

FIGS. 7, 8 and 9 illustrate the fitting of the same rivet R in a "mini grip" configuration.

As illustrated, the rivet R is positioned in a countersunk through hole T' provided in the two parts P1' and P2' for the purposes of assembly. The pin 100 is positioned to bear the countersunk head 110 thereof on the countersink of the hole T' and the ring 200 is engaged on the pin 100. The same tool O is associated with the second grooved portion 130 of the pin 100 so as to perform, by pulling on the pin 100, the deformation of the ring 200 on the first grooved portion 120.

It is obvious, in the drawing in FIG. 9, that the inner surface of the ring 200 molds as closely as possible to the grooves 121$p$ and 121$c$ and, to a lesser extent, the groove 121$d$.

The applicant conducted tests based on these embodiments enabling the fastener obtained to have an equivalent tear strength to that of a solid rivet both in a "mini grip" configuration and in a "maxi grip" configuration. The fastening member according to the invention, an example whereof is described above, thus achieves the aims of the invention. It is also obvious that minimizing the fitting force helps reduce the rupture slot and thus limit the tensile force applied on the pin head. This limits umbrella deformation of the head.

It is understood that the fastening member has been described above and represented with a view to disclosure rather than restriction. Obviously, various adjustments, modifications and enhancements may be made to the above example, without leaving the scope of the invention.

The invention claimed is:

1. A fastening member of the type comprising a pin and a ring, the pin comprising a head at one end and having on the body thereof a first grooved portion with a plurality of locking grooves or slots enabling the ring engaged on the pin to fasten thereto by means of deformation and a second grooved portion for engaging with a tool for holding the pin during the extrusion of the ring on the first grooved portion, a rupture slot facilitating the detachment of the second portion once a stress threshold has been exceeded during fitting, characterized in that the first grooved portion of the pin is preformed to have a sequence of non-helical grooves, the start and end whereof are formed by grooves having different profiles to the identical grooves situated in the central portion of the sequence, the different profile adopting an identical depth but a greater width to those of the profile of the grooves situated in the central portion of the sequence, characterized in that the different profile is non-symmetrical.

2. A fastening member according to claim 1, characterized in that the grooves are parallel.

3. A fastening member according to claim 1, characterized in that a plurality of grooves adopt a different profile at the start and end of the sequence.

4. A fastening member according to claim 1, characterized in that the start and end grooves of the sequence of grooves which have different profiles to those situated in the central portion, are mutually identical.

5. A fastening member according to claim 1, characterized in that the pin head is countersunk.

6. A fastening member according to claim 1, characterized in that the width of the different grooves is substantially equal to 1.5 times that of the identical grooves of the central portion of the sequence.

7. A fastening member according to claim 1, characterized in that the top surface of the pin head is convex.

8. A fastening member of the type comprising a pin and a ring, the pin comprising a head at one end and having on the body thereof a first grooved portion with a plurality of locking grooves or slots enabling the ring engaged on the pin to fasten thereto by means of deformation and a second grooved portion for engaging with a tool for holding the pin during the extrusion of the ring on the first grooved portion, a rupture slot facilitating the detachment of the second portion once a stress threshold has been exceeded during fitting, characterized in that the first grooved portion of the pin is preformed to have a sequence of non-helical grooves, the start and end whereof are formed by grooves having different profiles to the identical grooves situated in the central portion of the sequence, the different profile adopting an identical depth but a greater width to those of the profile of the grooves situated in the central portion of the sequence, characterized in that the width of the different grooves is substantially equal to 1.5 times that of the identical grooves of the central portion of the sequence.

9. A fastening member according to claim 8, characterized in that the grooves are parallel.

10. A fastening member according to claim 8, characterized in that a plurality of grooves adopt a different profile at the start and end of the sequence.

11. A fastening member according to claim 8, characterized in that the start and end grooves of the sequence of grooves which have different profiles to those situated in the central portion, are mutually identical.

12. A fastening member according to claim 8, characterized in that the different profile is non-symmetrical.

13. A fastening member according to claim 8, characterized in that the pin head is countersunk.

14. A fastening member according to claim 8, characterized in that the top surface of the pin head is convex.

* * * * *